United States Patent
Bohli et al.

(10) Patent No.: US 11,184,168 B2
(45) Date of Patent: Nov. 23, 2021

(54) METHOD FOR STORING DATA ON A STORAGE ENTITY

(71) Applicant: NEC Laboratories Europe GmbH, Heidelberg (DE)

(72) Inventors: Jens-Matthias Bohli, Leimen (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 15/999,349

(22) PCT Filed: Feb. 19, 2016

(86) PCT No.: PCT/EP2016/053578
§ 371 (c)(1),
(2) Date: Sep. 19, 2018

(87) PCT Pub. No.: WO2017/140381
PCT Pub. Date: Aug. 24, 2017

(65) Prior Publication Data
US 2019/0081783 A1 Mar. 14, 2019

(51) Int. Cl.
*H04L 9/08* (2006.01)
*H04L 9/14* (2006.01)
(Continued)

(52) U.S. Cl.
CPC ............ *H04L 9/0877* (2013.01); *G06F 3/064* (2013.01); *G06F 3/067* (2013.01); *G06F 3/0622* (2013.01);
(Continued)

(58) Field of Classification Search
CPC ....... H04L 9/08; H04L 9/0877; H04L 9/0822; H04L 9/3228; H04L 9/3242;
(Continued)

(56) References Cited

U.S. PATENT DOCUMENTS

| 8,694,467 | B2 * | 4/2014 | Sun | G06F 16/10 |
| | | | | 707/640 |
| 9,336,092 | B1 * | 5/2016 | Li | G06F 21/602 |

(Continued)

FOREIGN PATENT DOCUMENTS

| CN | 103403712 A | * | 11/2013 | ............. | G06F 17/30 |
| EP | 1775673 A2 | * | 4/2007 | ........... | H04L 9/3228 |
| JP | 5517263 B2 | * | 6/2014 | ............. | G06F 17/30 |

OTHER PUBLICATIONS

Removing the Root of Trust: Secure Oblivious Key Establishment for FPGAs by Lei Xu and Weidong Shi Published in: 2014 IEEE Computer Society Annual Symposium on VLSI INSPEC Accession No. 14615157; pp. 6 (Year: 2014).*

(Continued)

*Primary Examiner* — Samson B Lemma
*Assistant Examiner* — Ali H. Cheema
(74) *Attorney, Agent, or Firm* — Leydig, Voit & Mayer, Ltd.

(57) ABSTRACT

A method for storing data on a storage entity (SE) includes the steps of: (a) dividing a file to be stored into a plurality of chunks by a client; (b) computing a secret key for each of the chunks of the file; (c) computing for each of the chunks a chunk identifier by the client; (d) checking, by the SE, whether one or more of the chunks have already been stored based on the computed chunk identifiers; and (e) it a case where it is determined that one or more of the chunks have not already been stored, performing the following: encoding the corresponding chunks; computing chunk tags for the chunks using the computed secret key; and storing the encoded chunks and the chunk tags.

9 Claims, 7 Drawing Sheets

1) Chunking File
2) Establish Secret Key
3) Computing Chunk IDs
4) Encrypt Chunks and Compute PoR tags
5) Conduct PoR

(51) Int. Cl.
*H04L 9/30* (2006.01)
*H04L 29/06* (2006.01)
*G06F 3/06* (2006.01)
*G06F 21/62* (2013.01)

(52) U.S. Cl.
CPC ........ *G06F 21/6209* (2013.01); *H04L 9/0822* (2013.01); *H04L 9/14* (2013.01); *H04L 9/3006* (2013.01); *H04L 63/0428* (2013.01)

(58) Field of Classification Search
CPC . H04L 9/3271; H04L 9/14; H04L 9/30; H04L 9/3006; H04L 63/04; H04L 63/0428; H04L 67/02; G06F 3/06; G06F 3/0622; G06F 3/064; G06F 3/067; G06F 21/62; G06F 21/6209; G06F 16/10; H04N 7/1675
USPC ....... 713/171, 172, 184, 192, 180, 165, 167, 713/193; 707/640, 645
See application file for complete search history.

(56) References Cited

U.S. PATENT DOCUMENTS

| | | | | |
|---|---|---|---|---|
| 9,608,993 | B1* | 3/2017 | Camenisch | H04W 12/0802 |
| 10,567,155 | B2* | 2/2020 | Medwed | G06F 7/582 |
| 2003/0110382 | A1* | 6/2003 | Leporini | H04N 7/1675 |
| | | | | 713/172 |
| 2004/0088555 | A1* | 5/2004 | Girard | G07F 7/1008 |
| | | | | 713/192 |
| 2006/0179319 | A1* | 8/2006 | Krawczyk | H04L 9/3218 |
| | | | | 713/180 |
| 2008/0172562 | A1* | 7/2008 | Cachin | G06F 21/6218 |
| | | | | 713/193 |
| 2008/0189297 | A1* | 8/2008 | Schultz | H04L 63/0442 |
| 2012/0093312 | A1* | 4/2012 | Gammel | H04L 9/3271 |
| | | | | 380/255 |
| 2012/0221854 | A1* | 8/2012 | Orsini | H04L 63/0876 |
| | | | | 713/167 |
| 2014/0006498 | A1* | 1/2014 | Liu | H04L 67/02 |
| | | | | 709/204 |
| 2014/0013112 | A1* | 1/2014 | Cidon | G06F 16/137 |
| | | | | 713/165 |
| 2014/0025948 | A1 | 1/2014 | Caitlin et al. | |
| 2015/0006895 | A1* | 1/2015 | Irvine | H04L 9/3242 |
| | | | | 713/171 |
| 2015/0293817 | A1* | 10/2015 | Subramanian | G06F 11/1448 |
| | | | | 707/645 |
| 2016/0315779 | A1* | 10/2016 | Chan | H04L 9/3271 |
| 2017/0346625 | A1* | 11/2017 | Yan | G06F 21/602 |

OTHER PUBLICATIONS

Proofs of Retrievability via Hardness Amplication by Yevgeniy Dodis, Salil Vadhany and Daniel Wichsz pp. 30; Dated: Jan. 25, 2009.*

Compact Proofs of Retrievability by Hovav Shacham, Brent Waters (Communicated by Nigel P. Smart.) pp. 42; Online publication Sep. 1, 2012.*

Secure Data Deduplication in Cloud Environments By Fatema Rashid (B.S.Comp Sc., National University of Computer and Emerging Sciences, Pakistan, 2004) pp. 164; Dated: (Year: 2015).*

Enabling Data Integrity Protection in Regenerating-Coding-Based Cloud Storage: Theory and Implementation By Henry C.H. Chen and Patrick P.C. Lee pp. 10; IEEE vol. 25, No. 2, Feb. 2014.*

Survey on securing data storage in the cloud By chun-ting huang, lei huang, zhongyuan qin, hang yuan, lan zhou, vijay varadharajan and c.-c. jay kuo pp. 17; (Year: 2014).*

Secure Data Deduplication With Reliable Key Management for Dynamic Updates in CPSS By Mi Wen, Kaoru Ota, He Li, Jingsheng Lei, Chunhua Gu, and Zhou Su pp. 11; IEEE vol. 2, No. 4, Dec. 2015.*

Hovav Schacham et al.: "Compact Proofs of Retrievability", Dec. 7, 2008 (Dec. 7, 2008), Advances in Cryptology-Asiacrypt 2008, Springer Berlin Heidelberg, Berlin, Heidelberg, pp. 90-107, XP047029863.

* cited by examiner

METHOD FOR STORING DATA ON A STORAGE ENTITY

CROSS-REFERENCE TO PRIOR APPLICATIONS

This application is a U.S. National Stage Application under 35 U.S.C. § 371 of International Application No. PCT/EP2016/053578 filed on Feb. 19, 2016. The International Application was published in English on Aug. 24, 2017 as WO 2017/140381 A1 under PCT Article 21(2).

FIELD

The present invention relates to a method for storing data on a storage entity.

BACKGROUND

Cloud services are gaining increasing importance and applicability in a number of application domains, such as storage, computing services, etc. The "cloud" has recently gained several adopters among small and medium enterprises and large businesses that are mainly interested in fast development of new applications while minimizing the costs of both deployment and infrastructure management and maintenance.

Cost effectiveness is realized in the cloud through the integration of multi-tenancy solutions and storage efficiency solutions with efficient distributed algorithms that run on commodity hardware to ensure unprecedented levels of scalability and elasticity. The combination of multi-tenancy solutions with storage efficiency techniques, e.g., data deduplication enables drastic cost reductions. For instance, recent studies show that cross-user data deduplication can save storage costs by more than 50% in standard file systems, and by up to 90-95% for back-up applications as shown in the non-patent literature of Frederik Armknecht, Jens-Matthias Bohli, Ghassan Karame, Franck Youssef, Transparent Data Deduplication in the Cloud, In Proceedings of the ACM Conference on Computer and Communications Security (ACM CCS), 2015. Moreover, nearly three quarters of these savings could also be obtained by means of whole file deduplication.

The advent of cloud storage and computation services, however as recognized by the present inventors, introduces new threats to data security. Namely, in nearly all conventional cloud services, users lose control over their data and how data is processed or stored. For example, a permanent loss of customers' data in a cloud system due to lightning strikes that affect a local utility grid near a corresponding data center is possible. For example a conventional method which enables users to verify the integrity and availability of their outsourced data include Proofs of Retrievability (POR) is shown in the non-patent literature of Frederik Armknecht, Jens-Matthias Bohli, Ghassan Karame, Zongren Liu, Christian Reuter, Outsourced Proofs of Retrievability, In Proceedings of the ACM Conference on Computer and Communications Security (ACM CCS), Arizona, USA, 2014. The conventional method enables providing end-clients with the assurance that the data is retrievable.

Although these conventional methods can be effective in detecting data loss, the present inventors recognized that they completely ignore storage-efficiency requirements, such as multi-tenancy and data deduplication, which are being widely utilized by existing cloud storage providers. Namely, conventional solutions assume a single trusted tenant, i.e. an honest verifier, who pre-processes the files to create tags using secret material before outsourcing them to the cloud, and later regularly performs verifications, e.g., POR on the pre-processed files and tags in order to react as early as possible in case of data loss. However, in practice, given that files are typically deduplicated across tenants, and different tenants do not tend to trust each other, tenants will be reluctant on sharing the secret material used to construct tags in POR/PDP.

On the other hand, solutions where each tenant constructs and stores his own tags in the cloud do not scale well with the number of tenants in the system. In this case, the storage overhead of the tags threatens to cancel out the benefits of data deduplication over popular objects; for instance, the storage overhead required to store the tags of files owned by 20 tenants is almost 200% when compared to the original file size.

SUMMARY

In an embodiment of the present invention, a method for storing data on a storage entity (SE) is provided that includes the steps of: (a) dividing a file to be stored into a plurality of chunks by a client; (b) computing a secret key for each of the chunks of the file; (c) computing for each of the chunks a chunk identifier by the client; (d) checking, by the SE, whether one or more of the chunks have already been stored based on the computed chunk identifiers; and (e) in a case where one or more of the chunks have not already been stored, performing the following: encoding the corresponding chunks; computing chunk tags for the chunks using the computed secret key; and storing the encoded chunks and the chunk tags.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
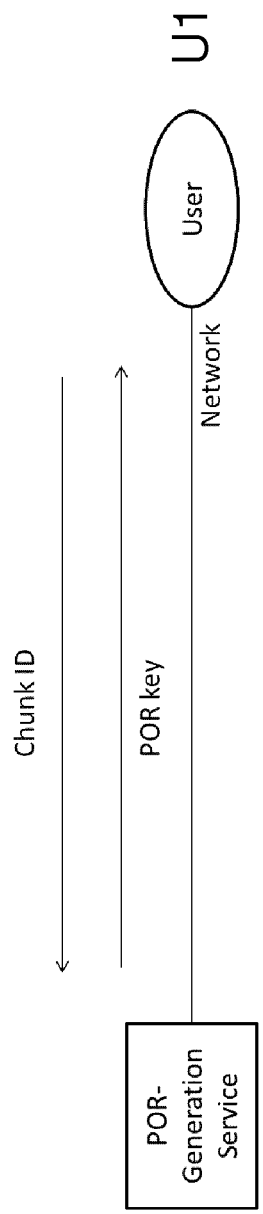
FIG. 1 shows schematically steps of a method according to an embodiment of the present invention.

Embodiments of the present invention relates to a method for performing a proof of retrievability for data stored on a storage entity.

Embodiments of the present invention relates to a storage entity for storing data.

Embodiments of the present invention relate to non-transitory computer readable medium storing a program causing a computer to execute a method for storing data on a storage entity.

Although applicable to any kind of storage or storage entity in general, embodiments of the present invention will be described with regard to cloud storage.

One of the problems addressed by embodiments of the invention is to provide multi-tenant publicly-verifiable proofs of retrievability. A further problem addressed by embodiments of the present invention is to enable proofs of retrievability in which tenants do not require to mutually trust each other. One of the further problems addressed by embodiments of the present invention is to provide storage efficiency and a secure and easy implementation.

In an embodiment the present invention, a method for storing data on a storage entity, 'SE', is provided that includes the following operations:
a) Dividing a file to be stored into a number of chunks by a client,
b) Computing a secret key for each chunk of the file,
c) Computing for each chunk a chunk identifier by the client,
d) Checking, by the SE, if one or more of the chunks have already been stored based on the computed chunk identifiers,
e) In case one or more of the chunks have not already been stored:
 (i) Encoding the corresponding chunks;
 (ii) Computing chunk tags for the chunks using the computed secret key;
 (iii) Storing the encoded chunks and the chunk tags.

An embodiment the present invention provides a method for performing a proof of retrievability for data stored on a storage entity, 'SE'. Here, a random challenge is computed and provided to the SE, the random challenge including a set of one or more coefficients and corresponding indices for the chunks. The SE computes a signature with the sum over the set of the product of the coefficients of the challenge and corresponding stored chunk identifiers on the SE. The SE computes a file part with the sum over the set of the product of the coefficients of the challenge and corresponding stored chunks. The client verifies retrievability of said data by checking whether the signature computed by said SE can be matched with the computed file part and local information of the client to be used for generation of a chunk identifier.

In an embodiment, the present invention provides a storage entity for storing data according a method of an embodiment, being adapted to store a chunk together with a chunk identifier.

In an embodiment, the present invention provides a non-transitory computer readable medium storing a program causing a computer to execute a method for storing data on a storage entity, 'SE', the method including the steps of:
a) Dividing a file to be stored into a number of chunks by a client,
b) Computing a secret key for each chunk of the file,
c) Computing for each chunk a chunk identifier by the client,
d) Checking, by the SE, if one or more of the chunks have already been stored based on the computed chunk identifiers,
e) In case one or more of the chunks have not already been stored:
 Encoding the corresponding chunks;
 Computing chunk tags for the chunks using the computed secret key;
 Storing the encoded chunks and the chunk tags.

The terms "storage entity" and "client" refer in particular in the claims, preferably in the description each to a device or devices adapted to perform computing like a personal computer, a tablet, a mobile phone, a server, a router, a switch or the like and include one or more processors having one or more cores and may be connectable to a memory for storing an application which is adapted to perform corresponding steps of one or more of the embodiments of the present invention. Any application may be software based and/or hardware based installed in the memory on which the processor(s) can work on. The devices or entities may be adapted in such a way that the corresponding steps to be computed are performed in an optimized way. For instance different steps may be performed in parallel with a single processor on different of its cores. Further the devices or entities may be identical forming a single computing device. The devices or devices may also be instantiated as a virtual device running on a physical computing resource. Different devices may therefore be executed on the physical computing resource.

The term "computer readable medium" may refer to any kind of medium, which can be used together with a computation device or computer and on which information can be stored. The information may be any kind of data which can be read into a memory of a computer. For example the information may include program code for executing with the computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

At least one embodiment of the present invention may have at least one of the following advantages: (i) deduplication is enabled not only of the files but also of the proof-of-retrievability tags across mutually untrusted tenants; (ii) different tenants do not require to share any secret material with each other; (iii) enhanced security since resistance against malicious proxy servers and cloud providers is enabled; and/or (iv) storage efficiency.

Further features, advantages and further embodiments are described or may become apparent by this specification.

The secret key may be computed based on an oblivious key generation procedure with a trusted entity. An oblivious key generation may involve a basic secret key held by the trusted entity and ensures that a trusted entity does not learn any information for example about the file to be stored for which the key are generated. Thus security is enhanced.

The chunk identifiers may be computed based on the contents of the chunk and the secret key. This enables for example file identifiers being dependent on the contents of each chunk.

The file is divided into the number of chunks by using Rabin fingerprinting. This allows in an easy and reliable way to provide content-dependent chunk or file identifiers.

The client may generate at least two different secret keys using different secure key generation functions. One of the secret keys is used for encrypting the file and one of the other secret keys is used for the generation of the chunk tags. This enhances the security since different keys can be used for encrypting the file and tagging the file respectively the chunks.

The corresponding chunks in step e) may be encoded using an information dispersal algorithm like erasure coding. Erasure coding ensures that extractability is provided such that a proof of retrievability can be easily and reliably performed.

The chunk tags may be signatures, a signature for a chunk being computed based on a signature generation function with input of a random number, the secret key of step c) and the contents of the chunk. This enables to generate proof of retrievability with the tags in an easy and reliable way.

The signature generation function may be computed as a linear combination of a pseudorandom-function and a product of the random number and the contents of the chunk. The pseudorandom function being secret key-dependent and a random number-dependent. This allows in a fast and reliable way to provide content dependent chunks for a later verification during a proof of retrievability.

The secret key may be computed locally using a local hardware token on the client, which may be provided by the SE. This enhances the security since this enables full protection of these keys against leakage or compromise. For example this can be used in TPMs or smartcards that are used by cloud vendors to pre-provision secret keys in the clients. The server aided key generation protocol is then emulated locally. Communication between clients and an outside trusted entity is then not done via an internet connection or the like but locally since the trusted entity is now emulated by the local hardware anchor present within the client device.

There are several ways how to design and further develop the teaching of the present invention in an advantageous way. To this end it is to be referred to the patent claims subordinate to the independent claims on the one hand and to the following explanation of further embodiments of the invention by way of example, illustrated by the figure on the other hand. In connection with the explanation of the further embodiments of the invention by the aid of the figure, generally further embodiments and further developments of the teaching will be explained.

FIG. 1 shows schematically part of steps of a method according to an embodiment of the present invention.

In FIG. 1 information flow between a proof of retrievability generation service and a user is shown. The proof of retrievability, 'POR', generation service is connected by a network to the user. The POR-generation service provides a POR key for the user. The user uses the POR key for computing for each chunk a chunk tag or chunk identifier.

Figure 2:
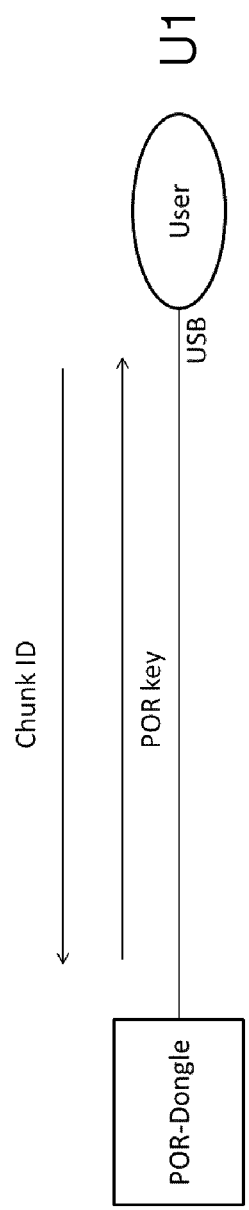
FIG. 2 shows schematically steps of a method according to an embodiment of the present invention.

FIG. 2 schematically shows part of steps of a method according to an embodiment of the present invention.

In FIG. 2 the user is provided with a proof of retrievability-dongle as a trusted entity which allows emulating locally a server aided key generation similar to FIG. 1. The communication between the POR-dongle and the user is for example performed via a wired connection like USB. The POR-dongle allows then to emulate the POR generation service similar to FIG. 1 to generate a POR key which is then in turn used by the user to compute chunk tags or chunk identifiers.

In more detail: In the following a number of clients or users U1, U2, . . . is assumed that are interested in storing their files at a storage provider S. The storage provide S exposes to its clients e.g. a standard interface including some simple operations, such as storing a file, retrieving a file, deleting a file, generating a URL for sending HTTP commands for storage/retrieval, etc.

Further a proxy or gateway is assumed to be present which can be queried by the clients U1, U2, . . . to assist them in deriving in an oblivious way a strong encryption key for content to be deduplicated.

The clients U1, U2, . . . are interested in obtaining a cryptographic proof that their files are stored in the cloud S in their entirety. For this purpose, the clients U1, U2, . . . and the cloud S frequently execute a challenge-response protocol to verify the integrity and availability of the file.

Further the clients U1, U2, . . . and the proxy share per-user keys and credentials (e.g., client certificates). In particular, all communication between a client U1, U2, . . . and the proxy is authenticated and, may also be, encrypted. Even further a secure encryption algorithm Enc and a cryptographic hash function H are provided.

The proxy is assumed to be honest but curious and that the cloud provider S is assumed to be malicious. Different tenants are assumed to not trust each other (and will not share a pair-wise key with each other). The proxy is announced to not collude with the cloud provider S at all times. This can be effectively realized if the proxy and the cloud provider S originate from different administrative domains.

In the embodiment, the key generation process is based on chunks and the principle to establish another secret which is used to bootstrap the POR tags is used.

In this case, if another tenant is trying to store the same file, the tenant will also be able to construct the same POR tags.

In detail, K denotes the key output by the client U1, U2, . . . after executing the oblivious server-aided generation protocol with the proxy. Given K, the client U1, U2, . . . generates two new keys using two different secure key derivation functions $KDF_1$ and $KDF_2$.

Namely, let $K_1 = KDF_1(K)$, and $K_2 = KDF_2(K)$.

The client U1, U2, . . . then computes for each chunk of the file a chunk identifier FID (e.g., based on $K_1$) and sends it to the cloud provider S. Here, two cases emerge:

i) The FID has not been stored by another tenant; and ii) The FID has been stored by another tenant.

In case of i), and since it is assumed that the cloud provider S keeps track of all file identifiers for the stored file, the cloud provider S can check whether the same file has been previously stored by another tenant. In case FID does not exist, the cloud S asks the client U1, U2, . . . to upload the file.

Figure 7:
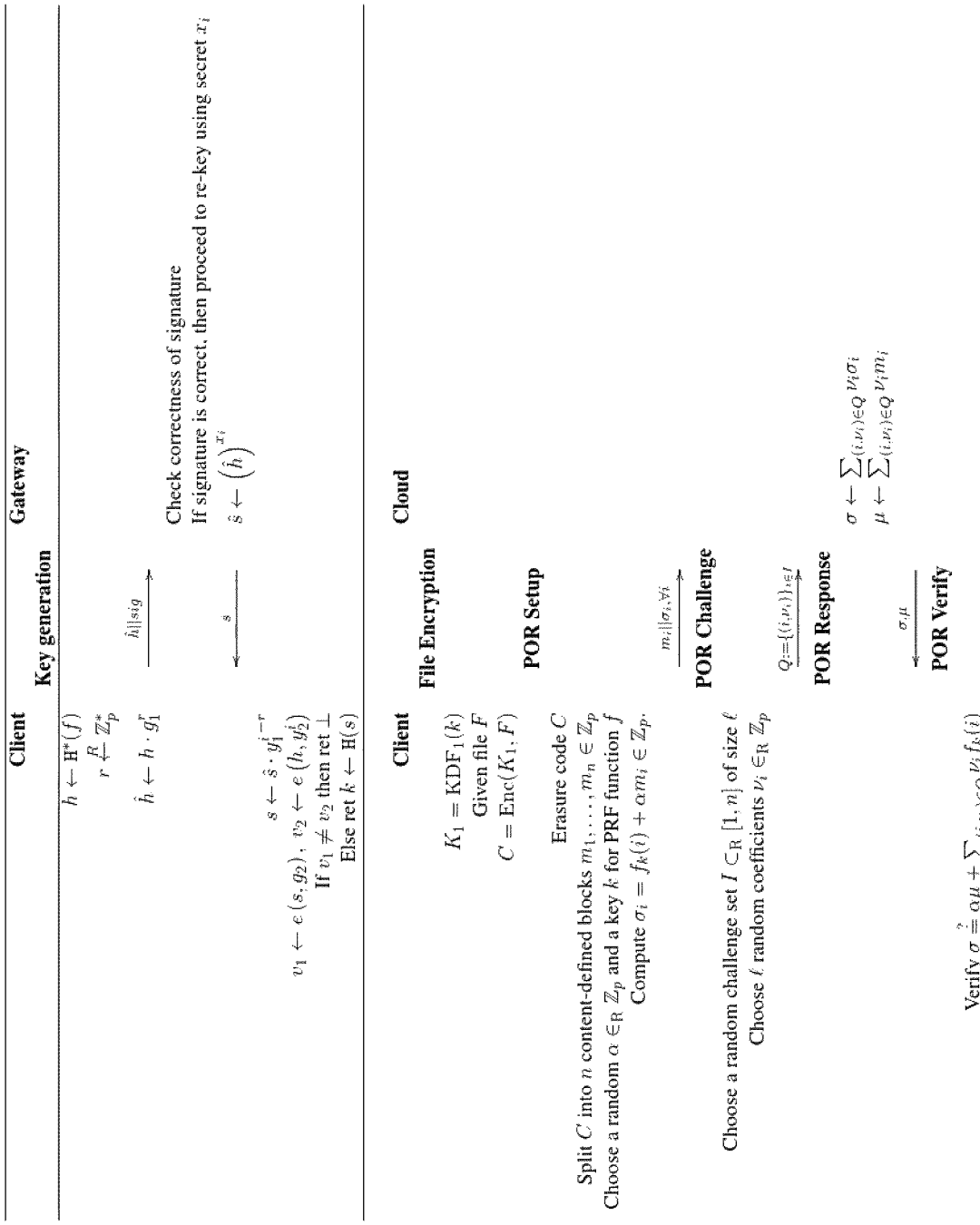
FIG. 7 shows schematically a method according to an embodiment of the present invention.

In this case, the client U1, U2, . . . encrypts the file F using $K_1$ and computes a ciphertext $C = Enc(K_1, F)$. The client U1, U2, . . . then applies an information dispersal algorithm on the ciphertext C and computes the POR tags using secret key $K_2$ according to the underlying POR scheme. In FIG. 7 a concrete instantiation is shown using the Shakham Waters privately-verifiable POR scheme. The tags of the files are here announced to be computed based on content. This can be performed by utilizing the Rabin fingerprinting algorithm, or by leveraging any similar content-based algorithm.

In case of ii), the client U1, U2, . . . directly conducts a POR with the storage provider S. The POR can be verified using the key $K_2$ generated by the client U1, U2, . . . as shown in FIG. 7. This method ensures that the cloud S indeed has the files and that the tags have been computed correctly by the previous tenants.

Figure 3:
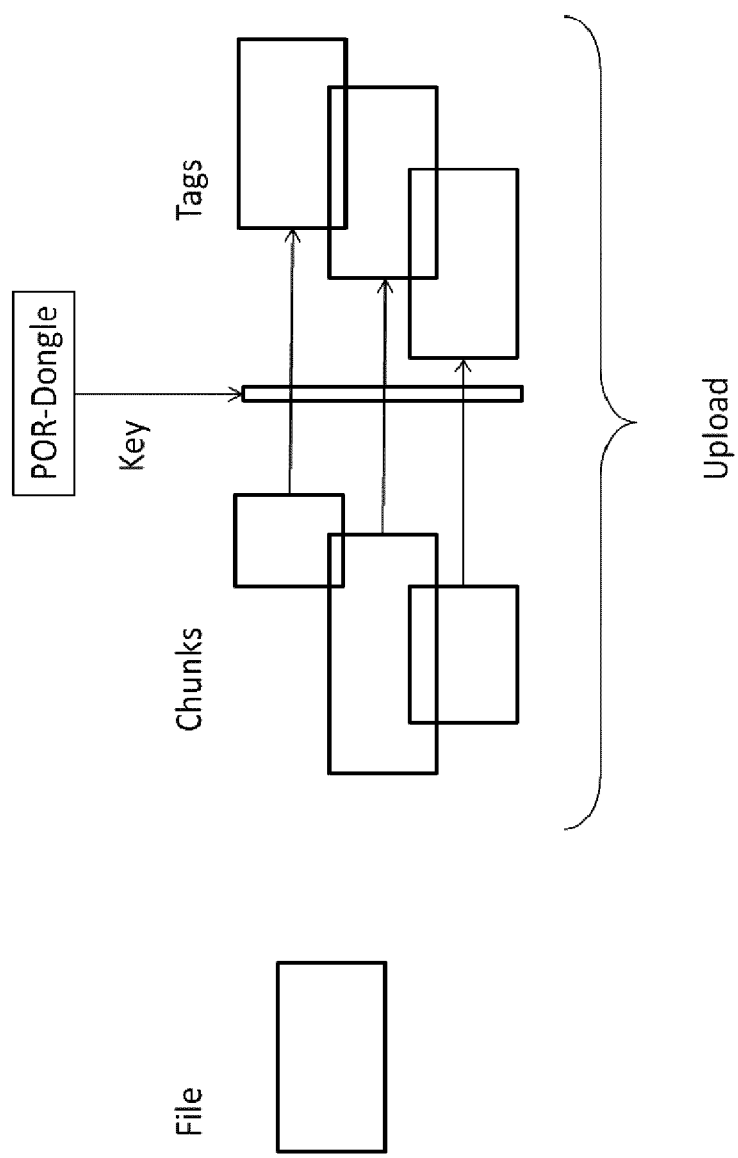
FIG. 3 shows schematically steps of a method according to an embodiment of the present invention.

FIG. 3 schematically shows part of steps of a method according to an embodiment of the present invention.

In FIG. 3 on the left side, a file is shown which is then divided into chunks. A proof of retrievability dongle acting as gateway or proxy provides the key for encrypting the chunks and tagging the chunks by computing corresponding tags for the chunks. The chunks together with the tags are then provided to the server S, indicated by "upload".

Figure 4:
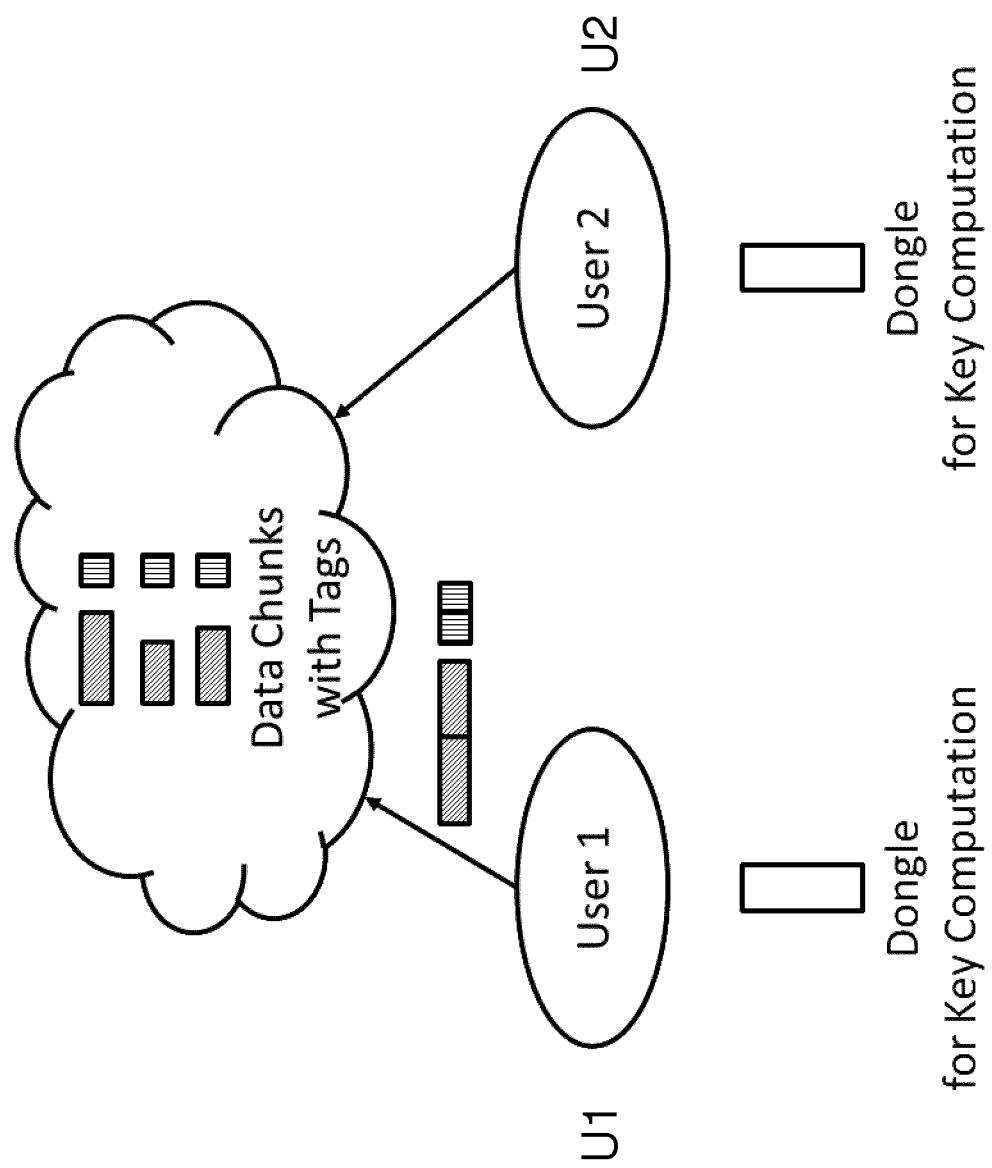
FIG. 4 shows schematically part of a system according to an embodiment of the present invention.

FIG. 4 schematically shows part of a system according to an embodiment of the present invention.

In FIG. 4, an example of a proof of retrievability according to an embodiment of the present invention is shown using deduplicated content-chunked blocks pertaining to 2 users.

In FIG. 4, two users, User 1, User 2 each have a dongle for corresponding key computation. User 1 performs the steps of FIG. 3, i.e. dividing the file to be uploaded into chunks and encrypting the chunks as well as computing the corresponding tags for the chunks. The User 1 the n uploads this information into the cloud S.

If User 2 wants to store chunks of a file he computes corresponding chunks identifiers and uploads them to the cloud S. The cloud S then checks whether a corresponding chunk identifier match to corresponding already stored chunks. Here in FIG. 4, all the chunks have already been stored. Thus, User 2 only updates the corresponding tags in the cloud.

FIG. 4 and FIG. 3 enable different clients U1, U2, . . . to agree on keys without the need for clients U1, U2, . . . to trust each other. Here, hardware support is leveraged to pre-provision keys in such a way that these keys can never leave the client devices. This ensures full protection of these keys against leakage or compromise. For instance, TPMs, smart cards and other methods enable cloud vendors to pre-provision secret keys in their clients, thus emulating a local assisting sever-aided key generation. In this case, the protocol unfolds exactly similarly to the protocol FIG. 7. However, communication between clients U1, U2, . . . and the proxy is not done via WAN, but locally, since the proxy is now emulated by the local hardware anchor present within the client device.

Figure 5:
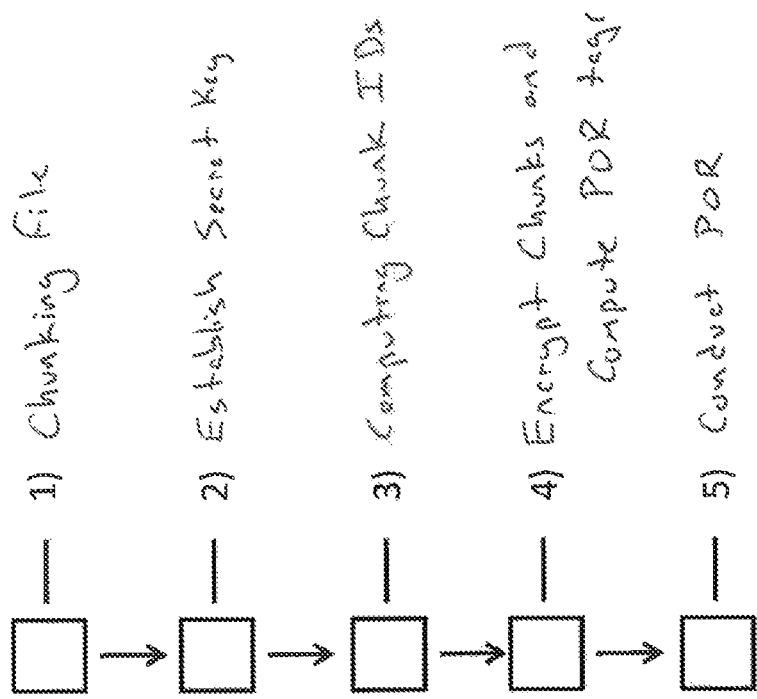
FIG. 5 shows schematically steps of a method according to an embodiment of the present invention.

FIG. 5 schematically shows part of steps of a method according to an embodiment of the present invention.

In FIG. 5, a method for storing data is shown including the steps of:
1) Chunking the file contents in variable sized chunks to achieve efficient storage savings;
2) Executing an oblivious server-aided key generation protocol to establish a secret key used to create the POR tags and to verify POR;
3) Computing a chunk ID and for each chunk and sending it to the cloud provider.
4) If the chunk ID is not stored, encrypt the chunk using secret key and compute POR tags and store chunk and tags at the cloud; and
5) If the chunk ID is stored, conduct immediately a POR with the cloud provider and verify the POR response using the secret key output by the oblivious server-aided key generation process.

Figure 6:
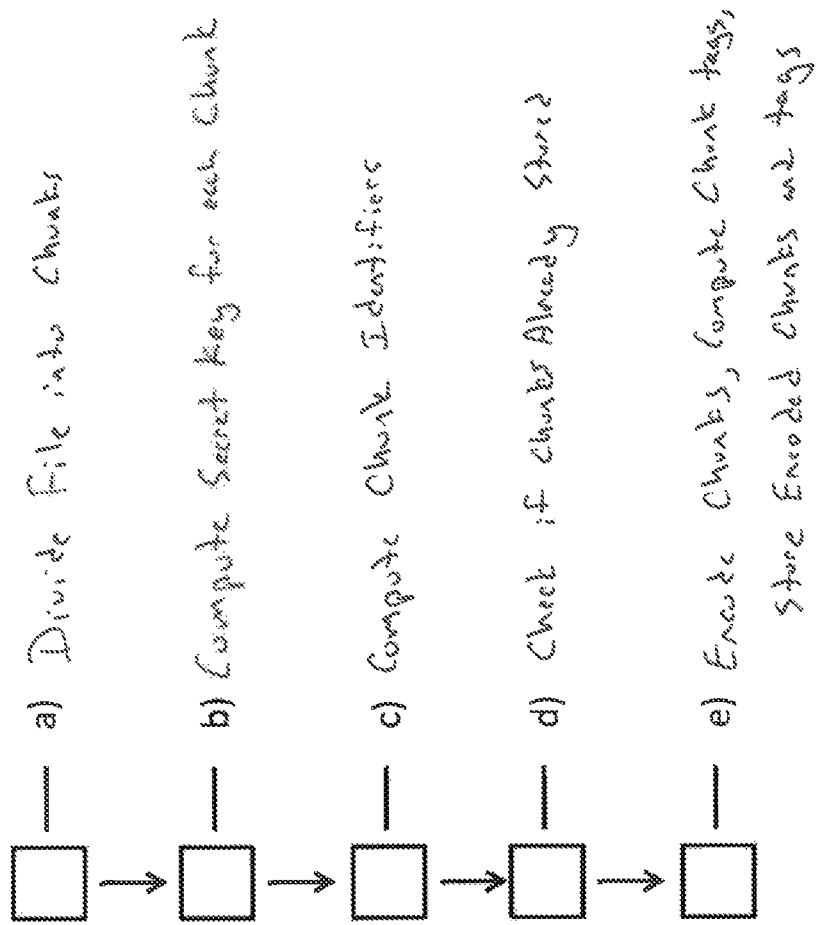
FIG. 6 shows schematically steps of a method according to an embodiment of the present invention.

FIG. 6 schematically shows part of steps of a method according to an embodiment of the present invention.

In FIG. 6 a method for storing data on a storage entity, 'SE', including the steps of:
a) Dividing a file to be stored into a number of chunks by a client;
b) Computing a secret key for each chunk of the file;
c) Computing for each chunk a chunk identifier by the client;
d) Checking, by the SE, if one or more of the chunks have already been stored based on the computed chunk identifiers; and
e) In case one or more of the chunks have not already been stored:
   Encoding the corresponding chunks;
   Computing chunk tags for the chunks using the computed secret key;
   Storing said encoded chunks and said chunk tags.

FIG. 7 schematically shows a method according to an embodiment of the present invention.

In FIG. 7, a key generation for obtaining a key as output after executing an oblivious server aided key generation a protocol is shown. This key is then used of the basis for file encryption and a proof of retrievability setup. To perform the proof of retrievability a challenge-response protocol, POR challenge and POR response is used. The POR response is then verified executing a POR verification procedure.

In detail: The proxy chooses two groups $\Gamma_1$ and $\Gamma_2$ with order p, and a computable bilinear map e: $\Gamma_1 \times \Gamma_2 \to \Gamma_T$. Additionally, the proxy chooses n private keys $x_1, \ldots, x_n \in \mathbb{Z}_p$, and their corresponding public keys $y_1^i = g_1^{x_i} \in \Gamma_1$ and $y_2^i = g_2^{x_i} \in \Gamma_2$. Let $H^*: \{0, 1\}^* \to \Gamma_1$ be a cryptographic hash function which maps bitstrings of arbitrary length to group elements in $\Gamma_1$. Prior to storing a file or a chunk f, the client computes $h \leftarrow H^*(f)$, blinds it by multiplying it with $g_1^r$, given a randomly chosen $r \in \mathbb{Z}_p$, and sends the blinded hash h to the gateway. The latter derives the signature on the received message and sends the result back to the client, who computes the unblinded signature s and verifies that:

$$e(s, g_2) = e(h^x g_1^{r x_i} g_1^{-r x_i}, g_2) = e(h, y_2^i)$$

If the verification is positive then the hash of the unblended signature gives the key k output after the execution of the oblivious server aided generation protocol. Given the key k the client generates then a new key using a secure deviation function $KDF_1$ and encrypts the file F with the generated key $K_1$. The client then further applies on the ciphertext C, i.e. the encrypted file F an erasure code and computes then the POR tags according to the following: The ciphertext being erasure coded is split into a number n of content defined blocks $m_1, \ldots, m_n \in \mathbb{Z}_p$. Then a random number $\alpha_i \in_R \mathbb{Z}_p$ is chosen and a key k for a pseudorandom function f. The POR tags are then computed for each chunk according to:

$$\sigma_i = f_k(i) + \alpha m_i \in \mathbb{Z}_p.$$

The corresponding content defined blocks $m_i$ and the corresponding tags $\sigma_i$ are then transmitted for storage to the cloud S.

To perform a proof of retrievability, as mentioned before, a proof of retrievability challenge-response is used: To create or generate a POR challenge a random challenge set $I \subseteq_R [1, n]$ of size l is chosen together with a random coefficients $v_i \in_R \mathbb{Z}_p$ and the corresponding set $Q := \{(i, v_i)\}_i \in_I$ is sent to the cloud S.

The cloud S then computes a sum of these random coefficients with the provided POR tags to compute the overall file identifier: $\sigma \leftarrow \Sigma_{(i, v_i) \in Q} v_i \sigma_i$. Further the same is performed for the corresponding content-defined blocks over the set: Q: $\mu \leftarrow \Sigma_{(i, v_i) \in Q} v_i m_i$ These computed values for the signature σ and the content-defined blocks μ is then transmitted back to the client U1, U2 for verification. The client U1, U2 then verifies if the computed signature equals:

$$\sigma \stackrel{?}{=} \alpha \mu + \Sigma_{(i, v_i) \in Q} v_i f_k(i).$$

If verification is successful then the data is proved to be retrievable.

In summary, embodiments of the present invention enable a management and protection of the keys compared with convergent encryption. Further, embodiments of the present invention enable to first split a given file in the chunks, for example, in a content dependent way, which enables deduplication. These chunks are useful performing a proof of retrievability significantly enhancing conventional proof of retrievability methods. Further, embodiments of the present invention enable to tie the savings of deduplication with proofs of retrievability. For each chunk key is obtained deterministically according to embodiments of the present invention and the proof of retrievability is executed using that key.

Embodiments of the present invention may have at least one of the following advantages: (i) supporting deduplication of files and their corresponding proof of retrievability tags across users; (ii) ensuring enhanced storage efficiency; (iii) pairwise keys do not have to be shared, different tenants do not need to synchronize with each other; (iv) management of keys; (v) protection of the keys; and/or (vi) high security, in particular against malicious proxy servers and malicious cloud providers.

As described, an embodiment of the present invention relates to a method for storing data on a storage entity, 'SE', that includes the operations of: (a) dividing a file to be stored into a number of chunks by a client; (b) computing a secret key for each chunk of the file; (c) computing for each chunk a chunk identifier by the client; (d) checking, by the SE, if one or more of the chunks have already been stored based on the computed chunk identifiers; and/or (e) in case one or more of the chunks have not already been stored: (i) encoding the corresponding chunks; (ii) computing chunk tags for the chunks using the computed secret key; and/or (iii) storing the encoded chunks and the chunk tags.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for storing data on a storage entity (SE), wherein the storage entity (SE) includes one or more processors having one or more cores and a memory for storing an application which is adapted to perform steps of:
   a) dividing a file to be stored into a plurality of chunks by a client;
   b) computing a secret key for each of the chunks of the the, wherein the secret key is computed by the client by obtaining a key from a trusted entity based on an oblivious key generation procedure with the trusted entity and thereafter generating the secret key using the obtained key and a secure deviation function;
   c) computing for each of the chunks a chunk identifier by the client, wherein the chunk identifiers are computed based on a content of the chunk and the secret key;
   d) checking, by the SE, whether one or more of the chunks have already been stored based on the computed chunk identifiers; and
   e) in a case where one or more of the chunks have not already been stored, performing the following;
      encoding the one or more chunks that have not already been stored;
      computing chunk tags for the one or more chunks that have not already been stored using the computed secret key, wherein the chunk tags are computed as a linear combination of i) a pseudorandom-function and ii) a product of a random number and a content of the chunk, and wherein the pseudorandom function is a function of the computed secret key and the random number; and
      storing the encoded chunks and the computed chunk tags.

2. The method according to claim 1, wherein the file is divided into the plurality of chunks by using Rabin fingerprinting.

3. The method according to claim 1, wherein the client generates at least two different secret keys using different secure key generation functions, and wherein one of the secret keys is used for encrypting the file and one of the other secret keys is used for generation of the chunk tags.

4. The method according to claim 1, wherein the corresponding chunks in step e) are encoded using an information dispersal algorithm.

5. The method according to claim 4, where the information dispersal algorithm is erasure coding.

6. The method according to claim 1, wherein the secret key is computed locally using a local hardware token on the client.

7. The method according to claim 6, wherein the local hardware token is provided by the SE.

8. The method according to claim 1, wherein each of the computed chunk tags is computed according to:

$$\sigma i = f k(i) + \alpha m i \in Z p,$$

wherein $\alpha$ is the random number, mi is the content of the corresponding chunk, σi is the corresponding chunk tag, k is the computed secret key, and f is the pseudo random function.

9. A non-transitory computer readable medium storing a program causing a computer to execute a method for storing data on a storage entity, 'SE', the method comprising the steps of:

a) dividing a file to be stored into a plurality of chunks by a client;
b) computing a secret key for each of the chunks of the file, wherein the secret key is computed by the client by obtaining a key from a trusted entity based on an oblivious key generation procedure with the trusted entity and thereafter generating the secret key using the obtained key and a secure deviation function;
c) computing for each of the chunks a chunk identifier by the client, wherein the chunk identifiers are computed based on a content of the chunk and the secret key;
d) checking, by the SE, if one or more of the chunks have already been stored based on the computed chunk identifiers; and
e) in a case where one or more of the chunks have not already been stored, performing the following:
   encoding the one or more chunks that have not already been stored;
   computing chunk tags for the one or more chunks that have not already been stored using the computed secret key, wherein the chunk tags are computed as a linear combination of i) a pseudorandom function and ii) a product of a random number and a content of the chunk, and wherein the pseudorandom function is a function of the computed secret key and the random number; and
   storing the encoded chunks and the computed chunk tags.

* * * * *